(12) United States Patent
Haman et al.

(10) Patent No.: US 9,794,093 B1
(45) Date of Patent: Oct. 17, 2017

(54) PASSIVE CLASSIFICATION OF RADIO FREQUENCY SIGNALS

(71) Applicant: HARRIS CORPORATION, Melbourne, FL (US)

(72) Inventors: Brian J. Haman, West Melbourne, FL (US); Raphael Lyman, Palm Bay, FL (US); Allan Weiner, Melbourne, FL (US); Abdelmoula Elharti, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 15/427,218

(22) Filed: Feb. 8, 2017

(51) Int. Cl.
| | | |
|---|---|---|
| *H04B 1/16* | (2006.01) | |
| *H04L 27/00* | (2006.01) | |
| *H04W 72/04* | (2009.01) | |
| *H04W 24/08* | (2009.01) | |
| *H04L 27/08* | (2006.01) | |
| *H04L 5/00* | (2006.01) | |
| *H04L 27/26* | (2006.01) | |

(52) U.S. Cl.
CPC ........ *H04L 27/0012* (2013.01); *H04L 5/0039* (2013.01); *H04L 5/0048* (2013.01); *H04L 27/08* (2013.01); *H04L 27/2601* (2013.01); *H04W 24/08* (2013.01); *H04W 72/0446* (2013.01)

(58) Field of Classification Search
CPC . H04L 27/0012; H04L 5/0039; H04L 5/0048; H04L 27/08; H04L 27/2601; H04W 24/08; H04W 72/0446
USPC ....................................................... 455/228
See application file for complete search history.

(56) References Cited

U.S. PATENT DOCUMENTS

| | | |
|---|---|---|
| 6,478,153 B1 | 11/2002 | King |
| 8,908,789 B2 | 12/2014 | Hu et al. |
| 8,934,431 B2 | 1/2015 | Xu et al. |
| 8,976,718 B2 | 3/2015 | Joung et al. |
| 9,167,561 B2 | 10/2015 | Zhang |
| 9,197,307 B2 | 11/2015 | Zhang et al. |
| 9,219,541 B2 | 12/2015 | Rubin et al. |
| 9,264,925 B2 | 2/2016 | Zhao et al. |
| 9,277,423 B2 | 3/2016 | Han et al. |
| 9,307,521 B2 | 4/2016 | Ng et al. |
| 9,319,928 B2 | 4/2016 | Bertrand et al. |
| 9,320,041 B2 | 4/2016 | Huang |
| 9,338,773 B2 | 5/2016 | Luo et al. |

(Continued)

OTHER PUBLICATIONS

Kawajiri, T., et al., "LTE Cell Planning Support Tool (CELPLA L)," Technology Reports, NTT Docomo Technical Journal vol. 13, No. 4, copyright 2012 NTT Docomo, Inc.

*Primary Examiner* — Sanh Phu
(74) *Attorney, Agent, or Firm* — Fox Rothschild LLP; Robert J. Sacco; Carol E. Thorstad-Forsyth

(57) ABSTRACT

System for passively classifying a signal as a user equipment (UE) generated uplink communication in accordance with in an LTE communication standard includes a radio frequency receiver and a computer processor operatively coupled to the receiver. The system evaluates physical parameters of the RF signals and obtains an extracted bit sequence contained in a time slot in which a Demodulation Reference Signal (DRS) would be normally transmitted. The extracted bit sequence information is compared to a plurality of known bit sequences specified for DRS in an LTE uplink communication.

20 Claims, 10 Drawing Sheets

(56) References Cited

U.S. PATENT DOCUMENTS

| | | |
|---|---|---|
| 9,374,665 B2 | 6/2016 | Johansson et al. |
| 9,374,722 B1 | 6/2016 | Hombs et al. |
| 9,397,812 B2 | 7/2016 | Popovic et al. |
| 2006/0285599 A1* | 12/2006 | Seki ............... H04L 25/022 375/260 |
| 2007/0098100 A1* | 5/2007 | Charbit ........... H04L 27/2655 375/260 |
| 2014/0199991 A1 | 7/2014 | Mukherjee et al. |
| 2015/0358092 A1* | 12/2015 | Kusunoki ......... H04B 17/309 370/329 |

* cited by examiner

PASSIVE CLASSIFICATION OF RADIO FREQUENCY SIGNALS

BACKGROUND

Statement of the Technical Field

The technical field of this disclosure comprises radio frequency signal identification, and more particularly concerns methods and systems for passive classification of radio frequency signals associated with certain types of wireless cellular networks.

Description of the Related Art

The related art concerns communication networks which are defined in accordance with a Long-Term Evolution (LTE) standard for high-speed wireless communications for mobile phones and data terminals. In an LTE network one or more User Equipment (UE) devices communicate using an Evolved UMTS Terrestrial Radio Access Network (E-UTRAN). In an LTE system, the E-UTRAN is comprised of a plurality of evolved base transceiver stations called eNodeB or eNB. Each eNB is usually a fixed station, and is used to control the EU devices in one or more cells. Each eNB comprising the E-UTRAN communicates with an Evolved Packet Core (EPC). The EPC utilizes packet data to communicate with packet data networks outside of the LTE architecture, including the internet and/or private corporate networks.

Each eNB in an LTE network sends and receives radio frequency transmissions to the UE's within its cell in accordance with a defined LTE air interface. To facilitate such communications, each eNB is comprised of radio frequency (RF) transmitter and receiver. An RF transmission from the eNB to an EU is generally referred to as a downlink communication. In contrast, a communication from the UE to the eNB is referred to as an uplink communication. In addition to facilitating communication of traffic data, the eNB also controls various operations of EU's within its cell by communicating signaling and control messages.

In accordance with an LTE air interface, UE communications with an eNB are time and frequency multiplexed. The uplink air interface can be defined by a physical uplink shared channel (PUSCH). Access to the PUSCH is time and frequency synchronized among a plurality of UE's to minimize interference. Additional details concerning the physical channels for evolved UMTS Terrestrial Radio Access (E-UTRA) are set forth in the ETSI TS 136 211 Technical Specification (version 9.10.0 or later), produced by the European Telecommunication Standards Institute (ETSI) 3rd Generation Partnership Project (3GPP).

SUMMARY

Embodiments concern a method and system for passively classifying a signal as a user equipment (UE) generated uplink communication in accordance with in an LTE communication standard. The method begins by selectively acquiring radio frequency (RF) signals originating within a predefined geographic area. The acquiring of RF signals as described herein can advantageously include a process by which a plurality of antenna beams are concurrently synthesized. Each beam is a signal in which the radio energy arriving at the antenna array from a specific direction is enhanced, while energy arriving from other directions is attenuated. These antenna beams are directed in a plurality of antenna boresight directions to concurrently acquire signals originating from one or more UE's located within a predefined geographic area.

Thereafter, physical parameters of the RF signals are evaluated, including frequency information and signal timing information to identify at least one potential UE generated uplink communication. The process involves determining the sum of the energy present in each Resource Block of the acquired RF signal, and comparing the sum to a first threshold value to determine if a potential LTE uplink signal is present in that Resource Block. Thereafter, groups of signal occupied Resource Blocks are identified that are contiguous in frequency, and each such group is treated as an uplink packet.

Information is extracted from the potential UE generated uplink communication. Such information is comprised of an extracted bit sequence that is contained in a time slot in which a Demodulation Reference Signal (DRS) would be transmitted by the UE in an actual uplink communication in accordance with the LTE communication standard. In the extracting step, a plurality of Resource Grid elements which correspond to the subcarriers of the DRS sequence are extracted from each uplink packet.

The information concerning the extracted bit sequence is compared with information concerning a plurality of known bit sequences specified for DRS in an LTE uplink communication. The comparing process can involve comparing the extracted bit sequence with the plurality of known bit sequences specified for DRS in an uplink communication over a range of possible Cyclic Shifts between 0 and $2\pi$. Notably, the range of possible cyclic shifts can exceed a number of Cyclic Shifts which are specified for an LTE uplink signal in accordance with an LTE standard.

Thereafter, the acquired RF signal is selectively classified as a UE generated uplink operating accordance with an LTE standard if the comparing satisfies a predetermined correlation condition. This process can involve choosing a sequence group number and Cyclic Shift pair that yields a highest correlation value.

The evaluation of the signal timing information can involve recovering a slot timing directly from the acquired RF signal to determine a beginning and an end time of each time slot in the acquired signal. In an embodiment disclosed herein, the recovery of said slot timing involves determining a time delay between the beginning of a sample of the acquired RF signal and a leading edge of a first full time slot. More particularly, the recovery of the slot timing can involve squaring the acquired RF signal to determine an amplitude signal, smoothing the amplitude signal (e.g. with a filter) to obtain a smoothed amplitude signal, and differentiating the smoothed amplitude signal. The smoothed amplitude signal is then wrapped on a wrapped time axis over intervals which are equivalent in duration to an LTE time slot (0.5 ms). For each point on the wrapped time axis, calculation is performed to determine a root-mean-square of the smoothed amplitude signal values. The calculation results in a signal which contains a plurality of signal peaks. A first one of the plurality of signal peaks corresponds to the beginning of a Sounding Reference Signal (SRS), and a second one of the plurality of signal peaks corresponds to the end of the SRS.

Embodiments also concern a system for passively classifying a signal as a user equipment (UE) generated uplink communication in accordance with in an LTE communication standard. The system includes a radio frequency receiver configured to selectively acquire radio frequency (RF) signals originating within a predefined geographic area. A computer processor is operatively coupled to the receiver. The system is configured to evaluate physical parameters of the RF signals. These physical parameters include frequency information and signal timing information to identify at least one potential UE generated uplink communication. The processor extracts from the potential UE generated uplink communication certain information. The information concerns an extracted bit sequence contained in a time slot in which a Demodulation Reference Signal (DRS) would be transmitted by the UE in an actual uplink communication in accordance with the LTE communication standard.

Once the extracted bit sequence information is obtained, the processor compares it to information concerning a plurality of known bit sequences specified for DRS in an LTE uplink communication. The processor then selectively classifies the acquired RF signal as a UE generated uplink operating accordance with an LTE standard if the comparing satisfies a predetermined correlation condition.

The system can further include a phased array antenna and a beamforming system. In combination these elements are arranged to facilitate concurrently synthesizing a plurality of antenna beams. The antenna beams are directed a plurality of antenna boresight directions, whereby signals originating from one or more UE's located within a predefined geographic area are concurrently acquired.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
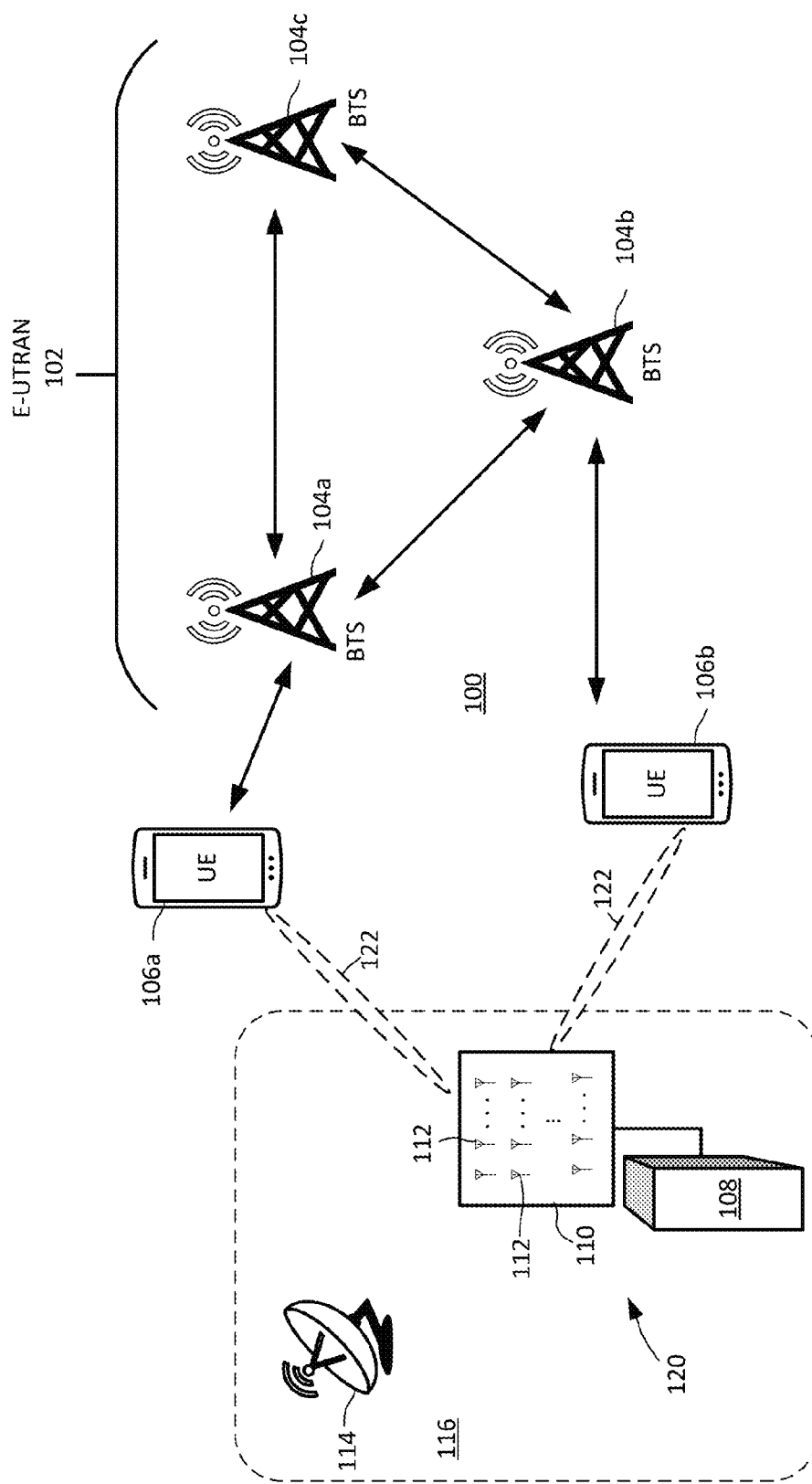
FIG. 1 is an illustrative communication network which is useful for understanding an embodiment of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Increasing demand for LTE communications has resulted in government authorities taking steps to allocate more radio frequency spectrum for LTE operations. In some instances these additional LTE frequency allocations have the potential to cause interference to existing services using shared RF spectrum. This is particularly so in those instances where LTE operators may fail to rigorously follow usage guidelines for the allocated spectrum.

When interfering signals are encountered by services in frequency allocations shared with authorized LTE frequency bands, it is important to have some means to determine whether such signals are actually associated with an LTE network. Such information can be useful for ensuring that the interference does not repeatedly occur in the future. It can also be useful to facilitate identification of non-LTE users who are violating spectrum allocation rules. But due to the fact that most of the LTE signal is encrypted (including all of the identifying information), devising a passive method for definitively classifying signals as LTE has proven to be quite challenging.

One such method for classifying a received signal as an LTE communication can involve passively receiving the interfering signal and identifying therein a Cyclic Prefix characteristic. Such an approach is disclosed in U.S. Pat. No. 9,264,925 to Zhao, et al. But the method disclosed therein has been determined to be error prone and is therefore not entirely satisfactory. An active approach to classifying as signal as LTE can involve active participation in handshake communications associated with an LTE air interface protocol. However, such active participation would involve actually transmitting signals to communicate with a potentially interfering UE device. There are several drawbacks to such active participation in an LTE communication session which render that approach unsuitable in many scenarios.

Accordingly, embodiments disclosed herein facilitate a definitive method to passively classify uplink signals associated with a communication system operating in accordance with an LTE standard. As used herein the phrase LTE standard or LTE specification refers to a communication system protocol as set forth in ETSI TS 136 211 Technical Specification (version 9.10.0 or later), produced by the European Telecommunication Standards Institute (ETSI) 3rd Generation Partnership Project (3GPP)). The embodiment methods disclosed herein are not subject to error and have the advantage of not involving active participation in an LTE handshake communication protocol. The process involves (1) deploying a highly sensitive receiver system to a communication location (e.g., a location which is subject to LTE interference), (2) utilizing physical layer attributes of signals associated with detected interference events to perform a preliminary classification of the interferer signal (LTE or other interference source) and (3) definitively classifying the signal as an LTE uplink communication if such signals include a Demodulation Reference Sequence (DRS) which corresponds to a known or permitted DRS sequence for an LTE standard.

A simplified diagram of a wireless communications system 100 is shown in FIG. 1. Communications system 100 is a cellular communications system configured to implement an LTE air interface in accordance with an LTE communication system standard. As such, the system 100 includes a plurality of base transceiver stations (BTS's) 104a, 104b, 104c that together comprise an Evolved UMTS Terrestrial Radio Access Network (E-UTRAN) 102 serving one or more User Equipment (UE) devices 106a, 106b. Within an LTE system, each BTS is commonly known as an evolved or enhanced Node B and is therefore sometimes referred to herein as an eNB. Each BTS includes receiver, transmitter and processing equipment to facilitate communications with one or more UE's 106a, 106b in a defined geographical area around each particular BTS. As is known, a radio communication range of each BTS 104a, 104b, 104c corresponds can correspond to a cell, which is a geographic area serviced by the BTS. In some instances, the area serviced by a BTS is geographically divided into two or more sectors, each serviced by a directional antenna. In such scenarios, each sector is basically treated as a separate cell.

Figure 3:
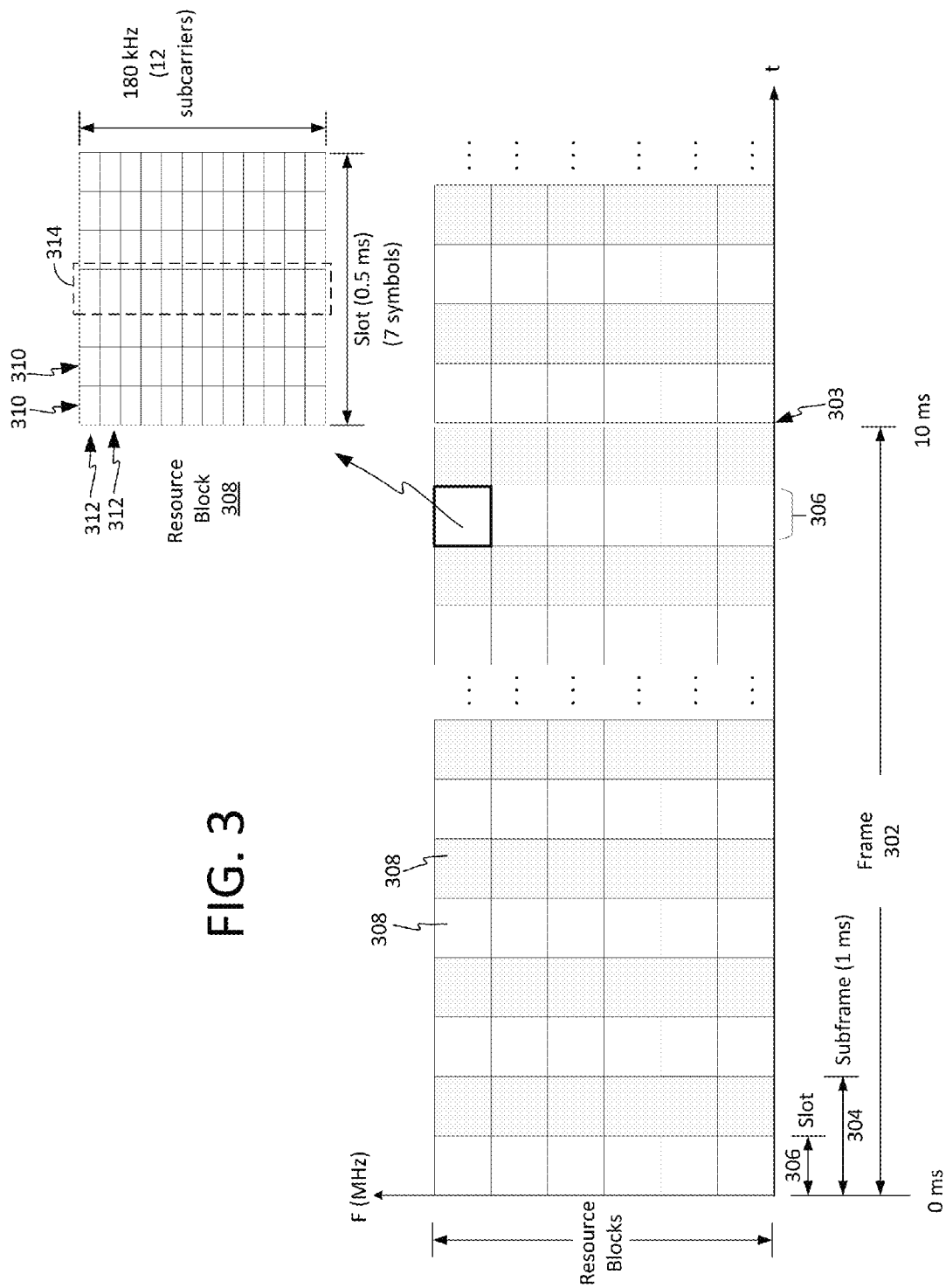
FIG. 3 shows a frame structure of LTE protocol which is useful for understanding an embodiment LTE detection process disclosed herein.

Uplink data signals from the UE 106a, 106b are communicated on a Physical Uplink Shared Channel (PUSCH) in accordance with a frame structure defined by the LTE specification. An exemplary radio frame structure corresponding to such LTE protocol is shown in FIG. 3. Each LTE frame 302 is 10 milliseconds (ms) in duration and is separated from the next radio frame by a frame boundary 303. Each frame 302 is comprised of ten subframes 304 having a duration of 1 ms. Each subframe 304 is comprised of two 0.5 ms time slots 306. A Resource Block 308 within the LTE frame structure is defined in terms of spectrum width and duration. More particularly, a Resource Block is 180 kHz wide in frequency and 1 slot in duration. The 180 kHz of spectrum associated with a Resource Block is usually subdivided so as to define 12 subcarriers 312, each being 15 kHz wide. Seven digital data symbols 310 can be transmitted during each 0.5 ms slot.

The Resource Block is the smallest unit of available spectrum resource that can be allocated to a UE 106a, 106b for uplink purposes. When necessary, a BTS can assign a plurality of Resource Blocks to a particular UE to facilitate an uplink transmission. All LTE uplink packets consist of one or more Resource Blocks, which are contiguous in frequency. The entire set of Resource Blocks for one time slot in an LTE band is called the Resource Grid.

The LTE standard specifies Single Carrier-Frequency Division Multiple Access (SC-FDMA) modulation for uplink communications from a UE 106a, 106b to a BTS 104a, 104b, 104c. SC-FDMA is also sometimes referred to as DFT-Spread OFDM (DFTS-OFDM) where DFT is an acronym that refers to Discrete Fourier Transform. As is known, formation of an SC-FDMA modulated signal typically comprises several steps. The user data is first modulated using a single carrier modulation format to produce a modulated time domain data signal. Examples of modulation formats which can be used for this purpose include QPSK, 16QAM, or 64QAM. Thereafter a Fast Fourier Transform (FFT) is applied to the time domain symbols of the selected modulation format to transform each symbol to the frequency domain. The frequency domain points are subsequently mapped onto the subcarriers 312 of a Resource Block 308 which has been assigned to the UE 106a, 106b for uplink transmission of the particular OFDM symbol 310. A final step in the process involves performing an inverse FFT (IFFT) on the entire OFDM symbol to obtain a corresponding time domain signal, which is then transmitted on the assigned subcarriers 312. The additional transformations which are associated with SC-FDMA modulation cause the information contained in each information bit to be spread over all of the subcarriers. This has the advantage of significantly smaller variations in the instantaneous power of the transmitted uplink signal.

A slightly different signal processing method is typically used to facilitate SC-FDMA modulation of those symbols that contain Demodulation Reference Signals (DRS), Physical Random Access Channel (PRACH), Physical Uplink Control Channel (PUCCH), or a Sounding Reference Signal (SRS). In those instances, the uplink transmitter at the UE 106a, 106b will insert the necessary modulation symbols directly onto the OFDM subcarriers. Thereafter, an IFFT is performed on the OFDM symbol to obtain the corresponding time domain signal, and the resulting time domain signal is transmitted.

The SRS is transmitted by the UE 106a, 106b as part of the LTE uplink. The SRS is used to estimate the uplink channel quality over a relatively wide bandwidth. The BTS uses information derived from the SRS for uplink frequency selective scheduling. The SRS is always transmitted in the last OFDM symbol in a subframe.

Every LTE uplink data or control packet includes one or more DRS transmission to help the base station correct for distortions caused by the radio channel. As shown in FIG. 3, each DRS 314 is a single SC-FDMA symbol out of the six or seven symbols transmitted in each 0.5 ms time slot. The DRS is transmitted in the fourth symbol of each slot for PUSCH. The DRS uses a frequency domain reference sequence as consecutive inputs of the OFDM modulator, plus a Cyclic Shift.

The sampled frequency components of the DRS form a sequence of complex numbers. The length of the sequence is a multiple of 12 and depends on the bandwidth of the packet. Thirty (30) different sequence groups are provided in accordance with the LTE standard. Each of these sequence groups consists of at least one DRS sequence. These sequences comprise the basic DRS sequences. Additional sequences are derived by applying different linear phase rotations (Cyclic Shifts) to the same basic DRS sequences. The twelve Cyclic Shifts each has a different value between 0 and $2\pi$.

Within a given time slot, the DRS sequence to be used within a particular cell is taken from one specific sequence group. If nearby base stations use different group numbers, this minimizes the co-channel interference between the cells. To ease cell planning, a base station's DRS sequence group number may be changed from slot to slot according to a hopping pattern that repeats every frame. Nearby cells are assigned different hopping patterns, according to their Physical Cell Identities. There are 504 unique PCIs, each with its own distinct hopping pattern.

The DRS transmitted by a UE is used at the BTS to estimate the signal propagation medium. This process is sometimes referred to as "channel estimation." Once the channel estimates have been determined based on the DRS, the resulting estimates can be used to facilitate equalization and ultimately demodulation of transmitted information. Unlike most uplink data that is communicated by a UE 106a, 106b, the DRS is not transmitted in encrypted form since it is only intended to be used for channel estimation.

To facilitate equalization, the DRS is transmitted on all subcarriers 312 allocated to the UE 106a, 106b at the defined times that are associated with certain symbols 310 within Resource Block 308. The DRS transmitted by UE 106a, 106b on the PUSCH is a Zadoff-Chu sequence. As is known, such a sequence will define a constellation of points on a circle. The DRS transmitted by the UE 106a, 106b on the PUCCH is a reference sequence transmitted on a rotated QPSK constellation. The amount of rotation is determined by a Cyclic Shift which is defined in the LTE standard.

Figure 4A:
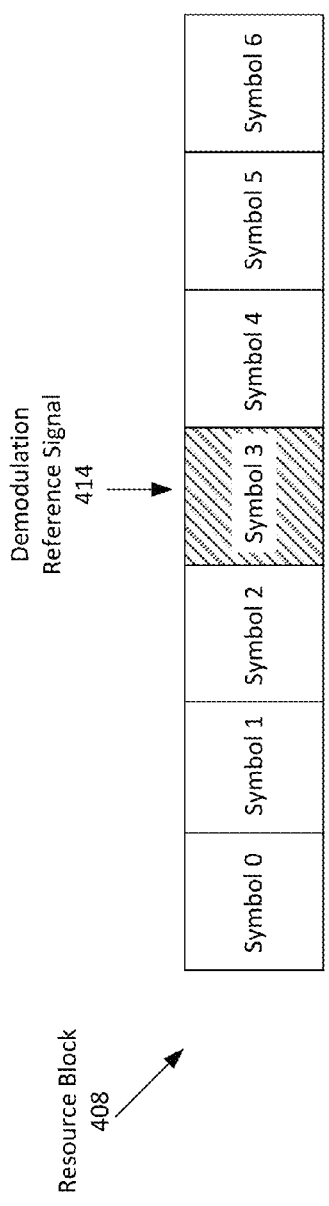
FIGS. 4A and 4B are a set of drawings that are useful for understanding how a sequence associated with a Demodulation Reference Signal (DRS) is recovered from an uplink signal
Figure 4B:
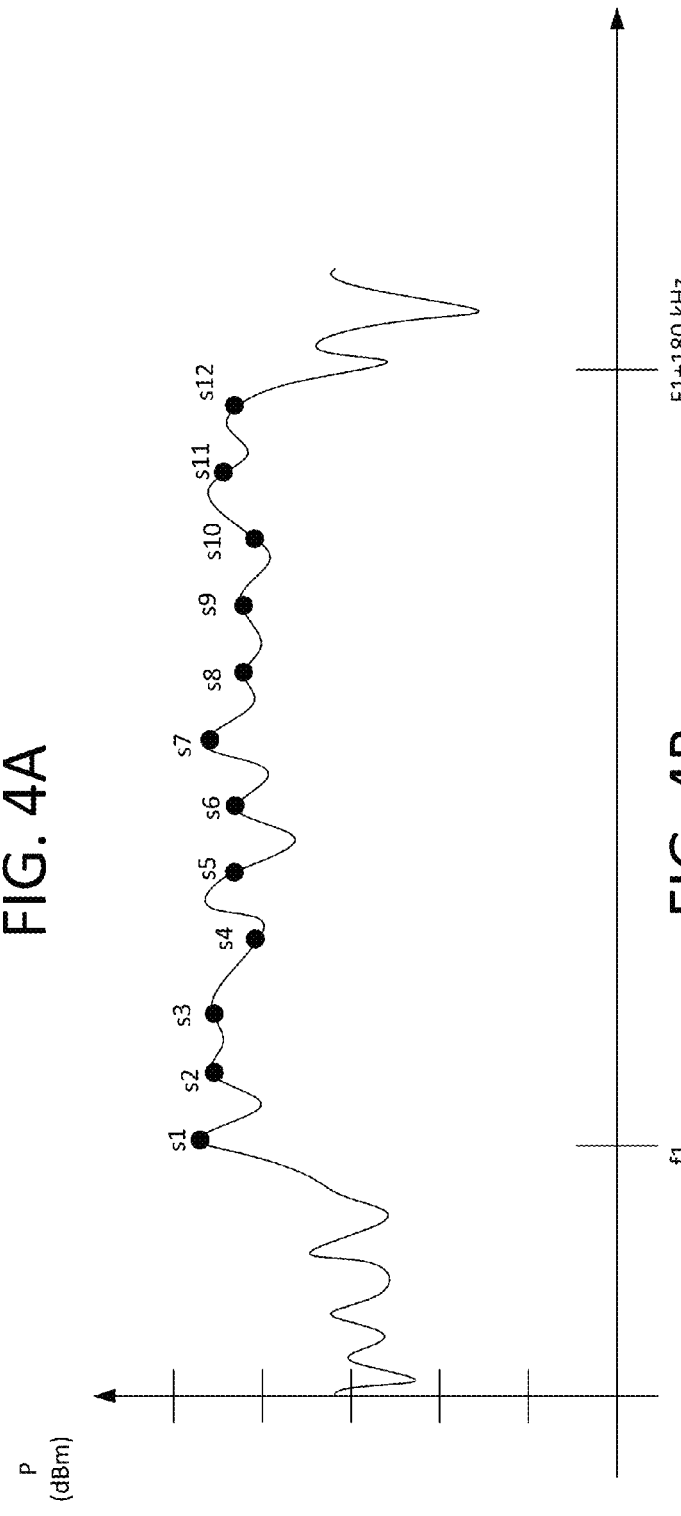

FIG. 4A shows an exemplary Resource Block 408 of an uplink signal in which the center symbol (symbol 3) is a DRS 414. A base station captures the DRS 414 as a time-domain signal and converts it into the frequency domain by performing a Fourier transform on each symbol. FIG. 4B shows an exemplary frequency sampling of the DRS 414 in the frequency domain. As best understood with reference to FIG. 4B, the receiver recovers the DRS sequence by sampling (s1-s12) the transformed signal at each subcarrier frequency. Each Resource Block has 12 subcarriers, spaced 15 kHz apart. Accordingly, the length of the DRS sequence depends on the number of Resource Blocks occupied by the packet. In the example shown, the DRS sequence is 12 points corresponding to the 12 subcarriers of a single LTE Resource Block, which has a time span of one slot and a bandwidth of 180 kHz. However, in other scenarios the DRS sequence can be a multiple of 12, depending on the number of Resource Blocks assigned to a UE for an uplink transmission.

Under certain circumstances, an uplink transmission from UE 106a, 106b to a BTS 104a, 104b or 104c has the potential of interfering with other radio communication services. For example, an uplink transmission 122 from a UE 106a, 106b to a BTS 104b could interfere with radio frequency communications conducted using an antenna 114. In such a scenario, the antenna 114 can be located in an geographic location 116 which is adjacent to an operating area of communication system 100. In such circumstances it can be advantageous to positively determine whether or not interfering signals are in fact the result of such LTE uplink communications. But because most of the LTE uplink signal is encrypted (including all of the identifying information), passive methods for determining whether a particular interfering signal is in fact an LTE uplink has proven to be quite challenging. Of course, active methods can be used for this purpose (e.g., methods involving actively engaging in LTE protocol handshakes); but due to licensing requirements, regulations and other concerns, these active methods are often unacceptable.

Accordingly, an embodiment passive detection system (PDS) 120 disclosed herein is advantageously deployed at a location where there is a need to definitively classify signals which may comprise an LTE uplink transmission. For example, such location can be physically proximate to a location 116 where an antenna 114 of a different radio communication service is potentially subject to LTE uplink interference. A proximate location can be a location within the geographic area serviced by the LTE communication system 100, or adjacent to such area. Of course, other locations are also possible and the system can be used anytime it is desirable to passively classify received signals as LTE uplink communications.

The PDS 120 is comprised of a receiver system 108 which is communicatively coupled to an antenna array 110. The receiver system 108 advantageously executes a blind signal detection algorithm disclosed herein. The process begins by simultaneously forming with the antenna array 110 numerous narrow high-gain antenna beams 122. These numerous narrow high-gain beams are synthetically formed by the receiver system 108. More particularly, such narrow high-gain antenna beams 122 can be formed by combining signals from multiple array elements 112 and selectively controlling a phase of the signal received by each array element 112. As such, it will be understood that the antenna array 110 is configured to operate as a phased array. The theory and operation of phased array antenna systems is well known in the art and therefore a complete discussion of phased array antennas is not provided here. However, it will be appreciated that in an array configuration as described, the number of array elements 112, and their arrangement (e.g., columns and rows) can be chosen to facilitate simultaneous formation or synthesis of numerous narrow high-gain beams in a required number of directions.

When directed toward a UE 106a, 106b, one or more of the simultaneously formed narrow high-gain antenna beams 122 can potentially facilitate receiving and detection of LTE uplink signals produced by such UE. If interfering signals are known to originate from only one side of an antenna 114 and/or antenna 110, then a planar array of antenna elements can provide satisfactory results. In other embodiments, an array of antenna elements can comprise a cylindrical array in which vertical columns of stacked antenna elements are distributed radially around a vertically oriented central axis. Such an arrangement is shown in FIG. 2 wherein an antenna array 210 is comprised of vertical columns of stacked antenna elements 212 which are distributed radially around vertically oriented central axis 218.

Figure 2:
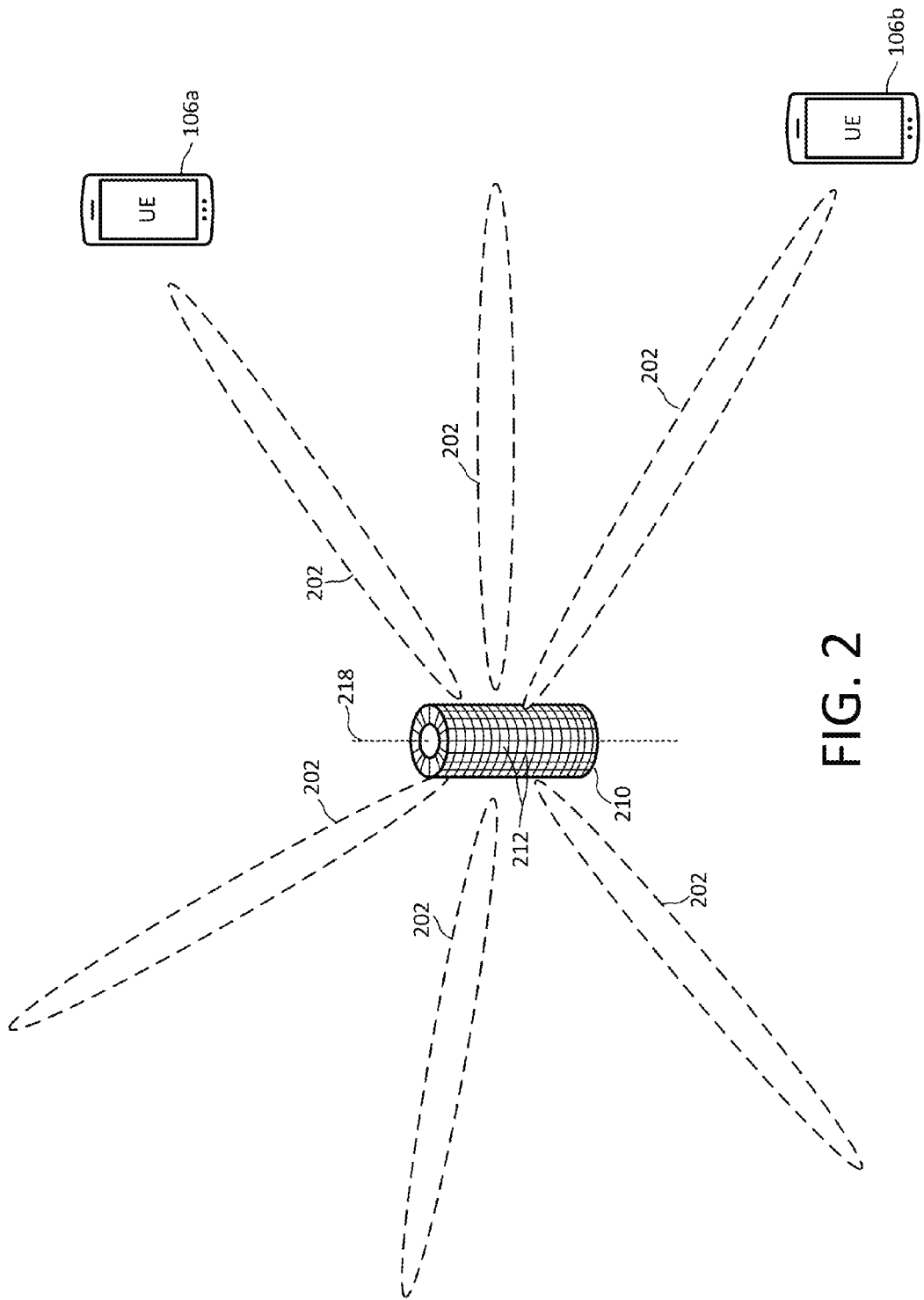
FIG. 2 is a diagram that is useful for understanding how a detection system disclosed herein executes a blind signal detection algorithm by simultaneously forming numerous narrow, high-gain beams from an antenna array.

The antenna array configuration in FIG. 2 can facilitate concurrent formation or synthesis of numerous narrow high-gain antenna beams 202 in azimuth directions which are distributed up to 360 degrees around the central axis 218, and at various antenna beam elevation angles. A cylindrical array 210 as described can be advantageous when a source of an interfering signals can be in any azimuth direction relative to the PDS 120. The arrangement shown in FIG. 2 also facilitates variation in the elevation direction of each beam 202. Of course, the embodiments are not limited to a cylindrical array as described herein and any suitable array configuration is possible.

Figure 5:
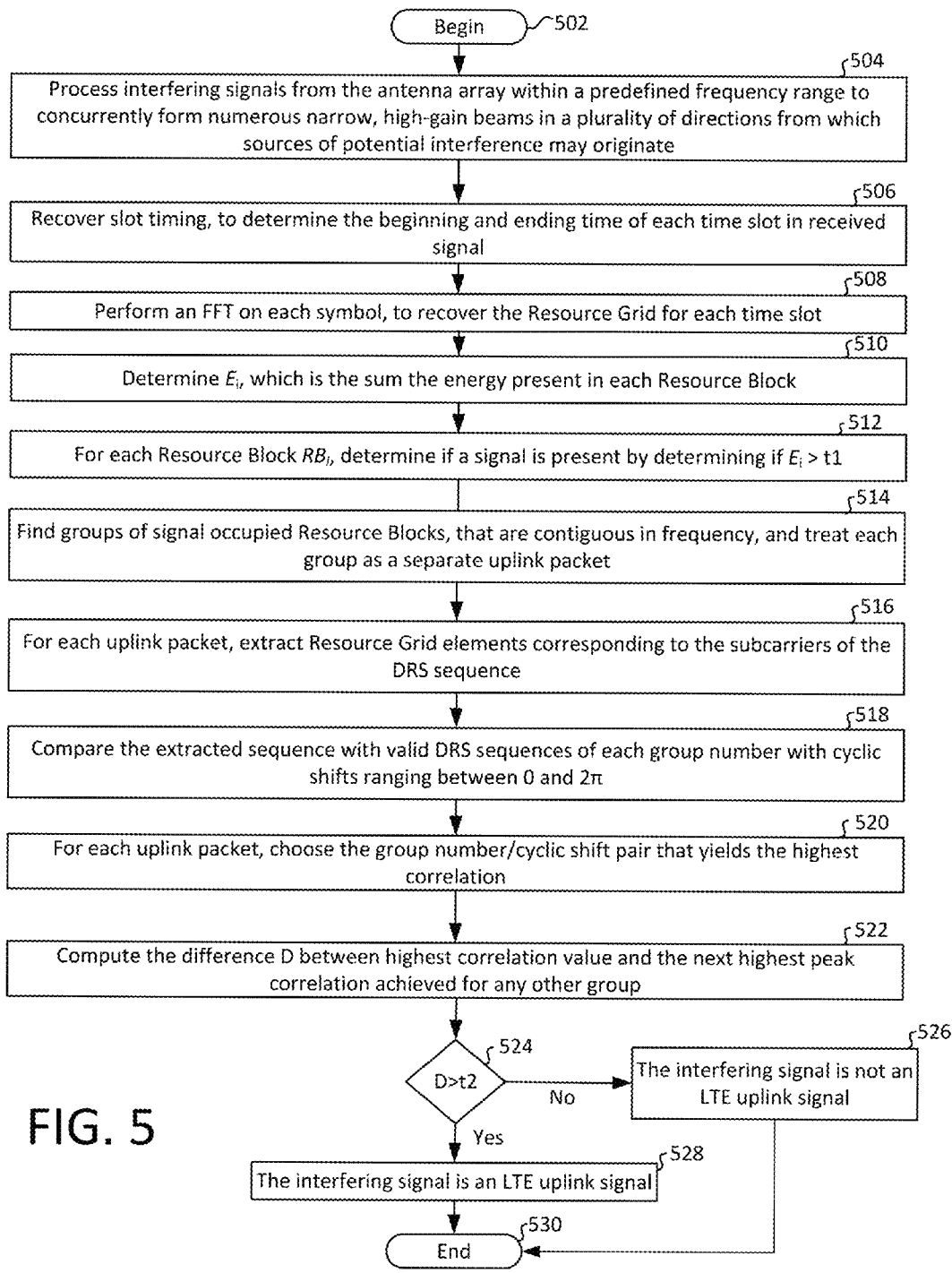
FIG. 5 is a flow chart that is useful for understanding a process for passively classifying a received signal as an LTE uplink communication.

Referring now to FIG. 5, a flowchart is provided which is useful for understanding a process by which a receiver system 108 can passively classify received signals as LTE uplink communications. The process begins at 502 and continues at 504 where the receiver system 108 processes signals from the antenna array within a predefined frequency range. For example, the predefined frequency range can be a frequency range over which government regulations permit LTE uplink transmissions within some geographic areas, but prohibits such LTE uplink transmissions in a different geographic area. Of course, the embodiments are not limited in this regard and any other frequency ranges are also possible.

The receiver system 108 processes received signals from the antenna array within the predefined frequency range to concurrently form numerous narrow, high-gain beams in a plurality of directions from which sources of potential interference may originate. An exemplary narrow high gain beam can have a beam-width in the range of 5° to 25° and a peak gain between about 3 dB and 10 dB. Of course, embodiments are not limited in this regard and these ranges are merely intended by way of example. A high gain beam is advantageous in the embodiments described herein because the UE's power output is relatively low and consistent detection cannot be ensured in the absence of a high-gain beam. The narrow width of the beam helps to spatially isolate interfering sources.

In receiver system 108, one or more processing elements comprising will concurrently synthesize a plurality of antenna beams over a predetermined range of azimuth angles and elevation angles. In some embodiments, these processing elements may collectively comprise a beamformer. The location of the antenna array, as well as the azimuth and elevation angles of the synthesized antenna beams can be selected so that a boresight angle of such beams points toward various locations where a source of a potentially interfering signal may be located.

The exact number of narrow, high-gain beams which are synthesized is not critical and can depend on the requirements of a particular application. However, the plurality of beams are advantageously selected so that they are sufficient in number (taking due consideration of the antenna beamwidth) to provide receive coverage over an entire geographic area where potential interfering sources may be located. In some scenarios, such a geographic area can be defined as an area extending from a location of communication equipment of a different communication service (e.g., equipment associated with a satellite ground station) to some predetermined distance.

In general, the number of beams which are synthesized should be sufficient to allow full coverage of a particular geographic area in which potential interferers may reside, while also allowing individual interfering sources (e.g., UEs) to be spatially isolated from other potentially interfering sources. So in an area with higher density of UE's, it can be desirable to synthesize a greater number of beams which are narrower in width as compared to areas in which there exists a lower density of UE's. The number of beams can be chosen in accordance with the number of potential interfering sources which are to be spatially isolated by the beams, the range of azimuth and elevation angles to be covered by the beams, and the amount of antenna gain required of each beam to facilitate detection and measurement of the various physical and data driven parameters described herein. The amount of gain and beam-width of each antenna beam will be determined at least in part by the number of available elements forming the antenna array.

Once the beams are synthesized, a first stage evaluation is made as to whether the interfering signal may be an LTE uplink transmission. This determination is based on whether the detected interfering signal has certain physical characteristics which are known to correspond to an LTE uplink. For example, the receiver system can determine whether the interfering signal corresponds to a predetermined frequency range that is known to be set aside or allocated for LTE uplink transmissions under at least some conditions. In this regard it should be appreciated that such a predetermined frequency range may generally be permitted for use as an LTE uplink, but can be prohibited when a UE is within a predetermined distance from equipment associated with other communication services which may experience interference from such LTE uplink. If the interfering signal is not within a known frequency range that is at least sometimes permitted for LTE uplink, then the process can optionally be terminated at this point.

One or more processing elements in the receiver system 108 can also determine a signal timing of the detected interference signal received in a particular antenna beam. Such determination can serve as an indication that the received signal meets certain criteria specified for LTE uplink transmissions by an LTE standard. For example, the one or more processing elements can determine if the interfering signals are being communicated in frames 302, subframes 304, and/or slots 306 having a timing specified by an LTE standard. The processing elements can also attempt to identify whether the symbols 310 within each slot 306 are of a predetermined duration which corresponds to the symbol timing of symbols in an LTE uplink transmission. In some embodiments the receiver system 120 can evaluate the timing of all of the foregoing timing criteria of the interfering communication. However, the embodiments are not limited in this regard and in some scenarios fewer than all of the foregoing timing criteria can be evaluated. As explained below in further detail, the signal timing evaluation performed in this step can also facilitate recovery of the slot timing of a received signal, so that the beginning and ending time of each time slot in the received signal is known. If the timing characteristics of the interfering signal do not correspond to known criteria associated with LTE uplinks, then the process can optionally be terminated at this point.

If the receiver system determines that the physical characteristics (frequency, timing) of the interfering signal do correspond to an LTE uplink transmission specification, the system can perform a further evaluation of certain data contained in the signal. Unlike most LTE uplink data, a DRS is transmitted in unencrypted format. So the receiver system 120 can advantageously evaluate the DRS which is transmitted by the UE to determine if it corresponds to one of the 30 valid DRS sequence groups which are specified by the LTE standard. If so, then the interfering signal can be definitively identified as an LTE uplink. If the DRS does not match a permitted sequence, then the interfering signal is classified as not being an LTE uplink signal.

The above-described process will now be described in further detail in relation to the flowchart in FIG. 5. The process begins at 502 and continues at 504 where signals from the antenna array within a predefined frequency range are processed to concurrently form numerous narrow, high-gain beams in a plurality of directions from which sources of potential interference may originate. The predefined frequency range will include at least one frequency range allocated for LTE uplink under at least some conditions. At 506 a slot timing of the received signal is recovered to determine the beginning and end of each time slot 306 contained in a received signal. Slot timing recovery will be described in greater detail as the discussion progresses.

At 508 a Fast Fourier Transform (FFT) is performed on each symbol within the slot to recover a Resource Grid for each time slot. In this regard it may be recalled that a Resource Grid is the entire set of Resource Blocks 308 for one time slot 306 in an LTE band. A single Once the Resource Grid has been recovered in this way, the process continues at 510 by determining $E_i$, which is the sum of the energy present in each Resource Block ($RB_i$) (where i is an index value corresponding to the number of Resource Blocks under evaluation). The process then continues at 512 where a determination is made as to whether a signal is present within each particular Resource Block $RB_i$. This step involves comparing the total energy $E_i$ contained in each Resource Block $RB_i$ to a predetermined threshold t1. If the total energy exceeds the threshold then a signal is determined to be present in that Resource Block.

Based on the evaluation in 512, the system then identifies at 514 those groups of signal occupied Resource Blocks, that are contiguous in frequency. Each such group which has been identified is thereafter treated as a separate uplink packet for purposes of the identification process described herein. At 516 each such uplink packet is processed to extract those Resource Grid elements corresponding to the subcarriers of the DRS sequence.

At 518 the process continues by determining a correlation of the extracted sequence from each uplink packet with a plurality of valid DRS sequences of each group number with Cyclic Shifts ranging between 0 and $2\pi$. Notably, the Cyclic Shift of the DRS sequence corresponds to a shift in the time domain, and has twelve possible values. But when attempting DRS sequence extraction by using only these twelve values, the process often fails. This is because of residual timing uncertainties that caused the Cyclic Shift to assume a value between 0 and $2\pi$ that is offset to some degree from the specified values. The solution to this problem is to test against a much larger set of potential Cyclic Shift values as opposed to only the standard ones.

Accordingly, in an embodiment disclosed herein, the extracted sequence can be compared to valid DRS sequences having numerous additional Cyclic Shifts values which are between 0 and $2\pi$. These Cyclic Shifts will be intermediate or offset from the 12 Cyclic Shift values specified by the LTE standard and therefore not necessarily consistent with the LTE standard for uplink transmissions. The system then chooses the group number/Cyclic Shift pair that yields the highest correlation to the extracted sequence from the uplink signal packet.

The process described herein facilitates highly reliable identification of LTE uplink transmissions without actively engaging in an LTE handshake process. The use of the DRS for this purpose helps to ensure positive identification. Notably, the purpose of the DRS is to correct for distortions caused by the radio channel. Because it is expected to be distorted when it is received, the ability to extract usable sequence data is unexpected. Still, by applying the techniques described herein, the DRS sequence data can be extracted and accurately identified, thereby leading to positive LTE uplink signal identification.

At 522 a further computation is performed to determine a difference D between the highest correlation value obtained at 520 and the next highest peak correlation achieved for any other group. If this difference D exceeds a given threshold t2, then the packet is declared at 528 to be a valid LTE uplink packet, and the DRS sequence is declared to have the group number found in step 520. If the difference D does not exceed the threshold t2 then the packet is declared at 526 to not be an LTE uplink signal. The process then terminates at 530 or continues with other processing.

Figure 6:
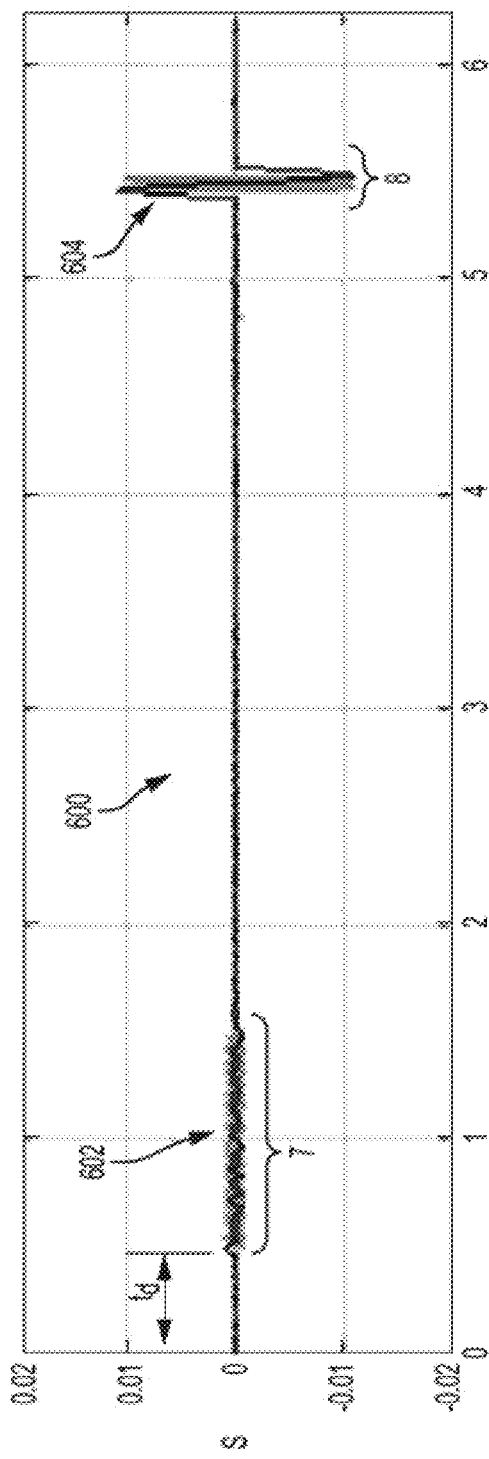
FIG. 6 is a diagram that is useful for understanding a portion of a time domain uplink LTE signal over several time slots.
Figure 8:
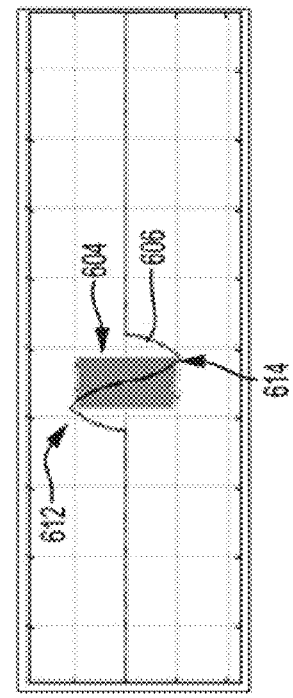
FIG. 8 is an enlarged view of a portion of the time domain signal in FIG. 6.
Figure 7:
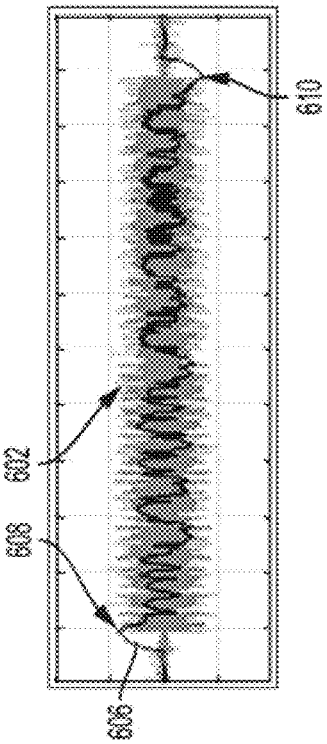
FIG. 7 is an enlarged view of a portion of the time domain signal in FIG. 6.

Timing recovery described above in step 506 can involve several steps. For timing recovery, we seek to determine the time delay to between the beginning of a sampled LTE uplink signal capture and the leading edge of the first full time slot. The approach is best understood with reference to the various plots shown in FIGS. 6, 7 and 8. In these plots, the time-domain captured signal 600 includes two distinct RF pulses 602 and 604. These pulses are shown enlarged in FIGS. 7 and 8. The first pulse 602 includes two consecutive data packets. The second pulse 604 is a Sounding Reference Signal (SRS). In this regard it may be recalled that the SRS is always transmitted in the last OFDM symbol in a subframe. Slot boundaries will coincide with some of the edges of these pulses. To find the edges, the signal 600 is squared to determine the amplitude, smoothed with a filter and differentiated numerically. The result is edge detecting signal 606 which is shown superimposed on captured signal 600 in the enlarged portions of the plot shown in FIGS. 7 and 8. For convenience in these graphs, the sign of the edge-detection signal 606 has been preserved, but the amplitude has been scaled as the square root. It can be observed in the figures that the largest peak amplitudes 608, 610, 612, 614 of this signal correspond to the pulse edges. The largest peak amplitudes of the edge detecting signal 606 correspond to the pulse edges.

Figure 9:
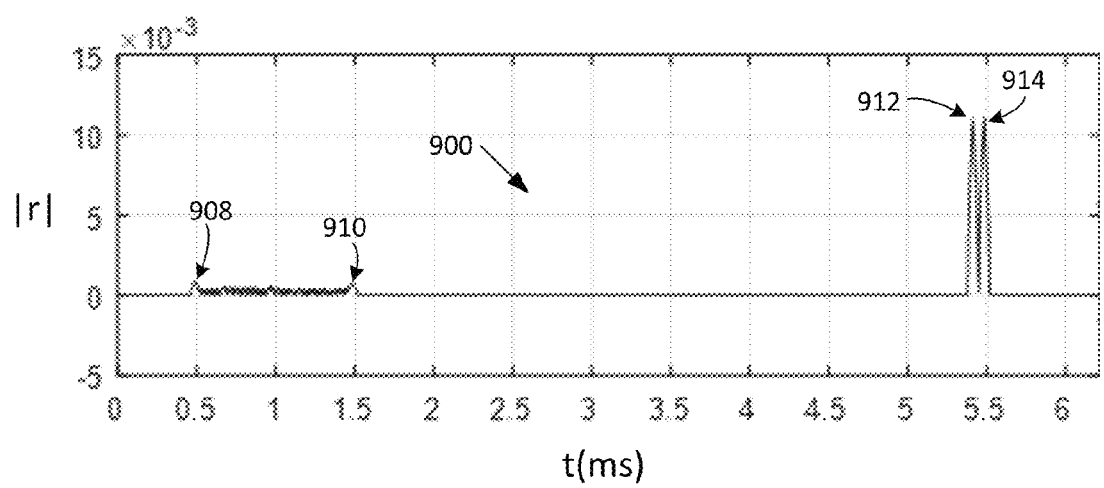
FIG. 9 is a plot of the magnitude of the time domain signal in FIG. 6.

The next step is to take the magnitude of the edge-detecting signal 606 and wrap it over a 0.5 ms interval, the same length as a time slot. The magnitude signal 900 is shown in FIG. 9. Note the peaks 908, 910, 912, 914 at the beginning and end of where each pulse is located in FIG. 9

Figure 10:
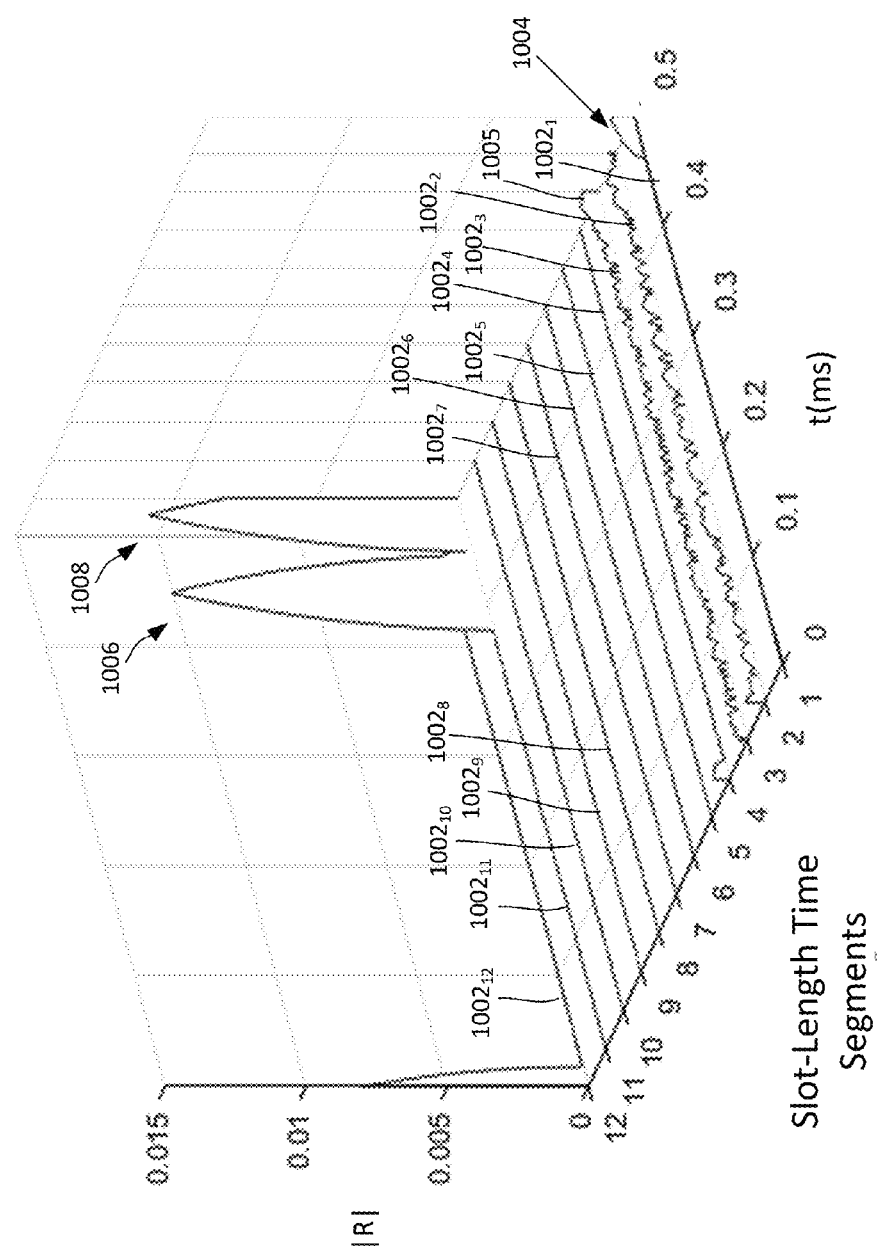
FIG. 10 is a three-dimensional plot showing the magnitude signal in FIG. 9 wrapped over an interval having a duration which is the same as a time slot to form 12 segments.

Wrapping the signal means (1) cutting it into 0.5 ms intervals, (2) dealing with each segment as a separate signal, and (3) taking the root-mean-square average value of all the segments at each time point between 0 and 0.5 ms. The process is shown in FIG. 10, where each wrapped segment $1002_1$-$1002_{12}$ is displayed side by side. The edge-detection signal indicates that the first RF pulse starts just before the end of the first segment at 1004, then continues through segment 2 and ends at 1005 just before the end of segment 3. The edge-detection signal continues to decay slightly at the beginning of segment 4. This RF pulse is the two consecutive data packets from FIG. 6. The second pulse, a Sounding Reference Signal, starts at 1006 and ends near the end of segment 11, with some continuing decay of the edge-detection signal at the beginning of segment 12.

Figure 11:
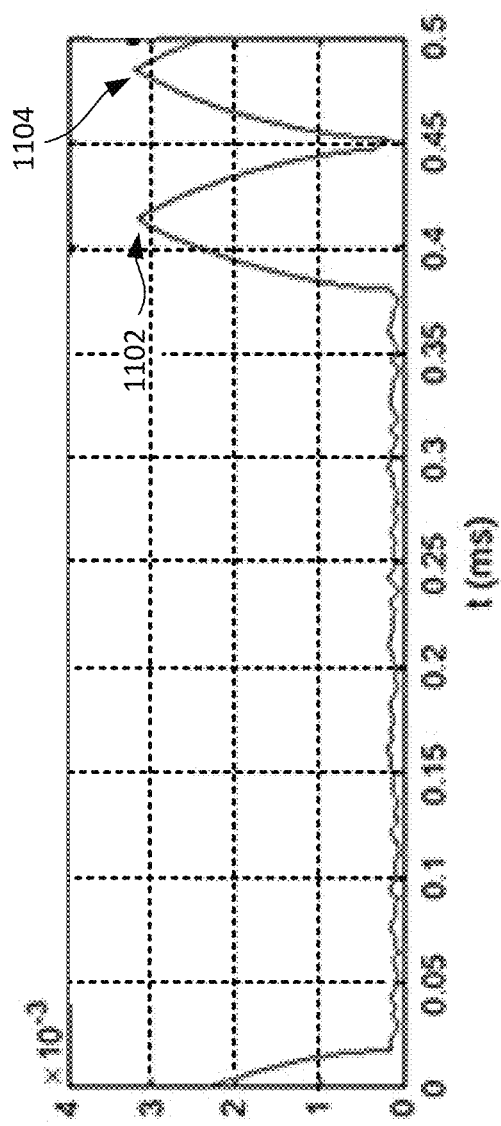
FIG. 11 is a plot which shows for each point on the wrapped time axis in FIG. 10, a root-mean-square value calculated from the values on the twelve segments at that time point.

For each point on the wrapped time axis shown in FIG. 10, we take the root-mean-square of the values on the twelve segments at that time point. The result is shown in FIG. 11. Note the wrapped signal includes two peaks. By comparison with FIG. 10, it can be seen that a first peak 1102 corresponds to the beginning of the Sounding Reference Signal 1006. The second peak 1104 corresponds to (1) the end of the SRS 1008, (2) the beginning and first data packet 1004 and (3) the end of the second data packet 1005.

As is known, every data packet begins on a time-slot boundary. Also the end of every SRS occurs on a slot boundary. Thus, it is clear that the second peak 1104 in FIG. 11 coincides with a slot boundary. In this example, it can be observed that the first full time slot begins almost 0.5 ms after the beginning of the data capture.

Normally, the highest peak in the plot of FIG. 11 corresponds to the time slot boundary. But frequently, as in this case, the SRS signal is very high in amplitude, causing more than one peak of nearly the same amplitude. The two peaks are separated by the duration of a Sounding Reference Signal. To avoid an error in this case, the time positions of the two largest peaks in FIG. 11 can be measured. If the time separation between the peaks 1102, 1104 is not nearly the same as an SRS pulse duration, the time of the highest peak can be accepted as a measure of the time-slot boundary location. If the two peaks are close to an SRS pulse duration, the second of the two peaks is chosen as the location of the time-slot boundary, regardless of whether it is the largest.

A further complication can occur when an SRS occurs near the end of one of the wrapped segments of FIG. 10. In that case, when the root-mean-square is taken, as in FIG. 11 one peak 1102 will occur near the end of the segment and the second peak 1104 will occur near the beginning, with the time separation being 0.5 ms minus the SRS pulse duration. When that occurs, the peak nearest the beginning of the segment is chosen as indicating the time-slot boundary.

Figure 12:
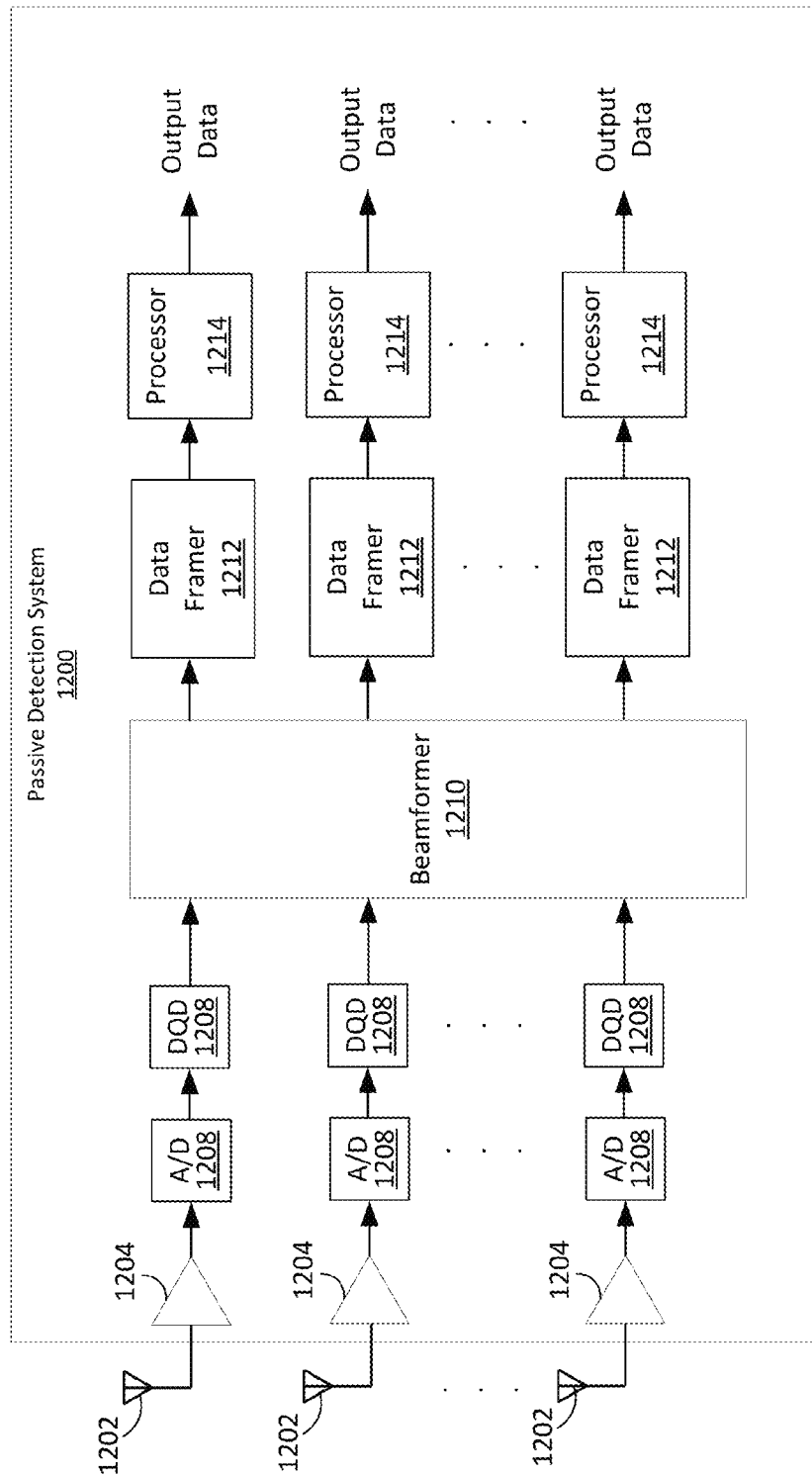
FIG. 12 is a block diagram of a receiver system that is useful for carrying out the methods described herein.

Referring now to FIG. 12, there is shown a block diagram of a passive LTE classification system 1200 as described herein. The output of each element 1202 of the antenna array is amplified in a low-noise amplifier 1204 and converted to a digital signal using an analog-to-digital converter 1208. A digital quadrature downconverter (DQD) 1208 is then used to convert the signal to complex baseband, filter the signal and reduce its sampling rate. These complex signals are then combined into multiple output beams in the beamformer 1210. Each beam is a signal in which the radio energy arriving at the antenna array from a specific direction is enhanced, while energy arriving from other directions is attenuated. Data from each of these beams are then passed to a data framer 1212 where it is segmented into time frames. The time frames are each of a duration which is long enough to include one or more 0.5 ms. time slots. The data frames are then passed to a computer processor element 1214, in which the remaining operations of the LTE classification procedure are carried out. For example, in the flowchart shown in FIG. 5 these could include operations described with respect to 508-530.

The systems described herein can comprise one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited.

Embodiments of the inventive arrangements disclosed herein can be realized in one computer system. Alternative embodiments can be realized in several interconnected computer systems. Any kind of computer system or other apparatus adapted for carrying out the methods described herein is suited. The computer system can have a computer program that can control the computer system such that it carries out the methods described herein. A computer system as referenced herein can comprise various types of computing systems and devices, including a server computer, which are capable of executing a set of instructions (sequential or otherwise) that specifies actions to be taken by that device.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for passively classifying a signal as a user equipment (UE) generated uplink communication in accordance with an LTE communication standard, comprising:
   selectively acquiring radio frequency (RF) signals originating within a predefined geographic area;
   evaluating physical parameters of the RF signals, including frequency information and signal timing information, to identify at least one RF signal that has at least one physical characteristic which is known to correspond to an LTE uplink transmission;
   selectively classifying the identified at least one RF signal as a potential UE generated uplink communication;
   extracting from the potential UE generated uplink communication information concerning an extracted bit sequence contained in a time slot in which a Demodulation Reference Signal (DRS) would be transmitted by the UE in an actual uplink communication in accordance with the LTE communication standard, the DRS comprising a known bit sequence permitted by the LTE communication standard for channel estimation;
   comparing the information concerning the extracted bit sequence with information concerning a plurality of known bit sequences specified for DRS in an LTE uplink communication; and
   selectively re-classifying the identified at least one RF signal as a UE generated uplink operating in accordance with an LTE standard if the comparing satisfies a predetermined correlation condition.

2. The method according to claim 1, wherein the acquiring further comprises concurrently synthesizing a plurality of antenna beams, in a plurality of antenna boresight directions to concurrently acquire signals originating from one or more UE's located within a predefined geographic area.

3. A method for passively classifying a signal as a user equipment (UE) generated uplink communication in accordance with in an LTE communication standard, comprising:
   selectively acquiring radio frequency (RF) signals originating within a predefined geographic area;
   evaluating physical parameters of the RF signals, including frequency information and signal timing information to identify at least one potential UE generated uplink communication;
   extracting from the potential UE generated uplink communication information concerning an extracted bit sequence contained in a time slot in which a Demodulation Reference Signal (DRS) would be transmitted by the UE in an actual uplink communication in accordance with the LTE communication standard;
   comparing the information concerning the extracted bit sequence with information concerning a plurality of known bit sequences specified for DRS in an LTE uplink communication;
   selectively classifying the acquired RF signal as a UE generated uplink operating accordance with an LTE standard if the comparing satisfies a predetermined correlation condition;
   wherein the evaluating of the signal timing information comprises recovering a slot timing directly from the acquired RF signal to determine a beginning and an end time of each time slot in the acquired signal.

4. The method according to claim 3, wherein the recovering of said slot timing comprises determining a time delay between the beginning of a sample of the acquired RF signal and a leading edge of a first full time slot.

5. The method according to claim 3, wherein the recovering of said slot timing comprises squaring the acquired RF signal to determine an amplitude signal, smoothing the amplitude signal with a filter to obtain a smoothed amplitude signal, and differentiating the smoothed amplitude signal.

6. The method according to claim 5, further comprising, wrapping the smoothed amplitude signal on a wrapped time axis over intervals which are equivalent in duration to an LTE time slot.

7. The method according to claim 6, further comprising for each point on the wrapped time axis, calculating a root-mean-square of the smoothed amplitude signal values to determine a plurality of signal peaks.

8. The method according to claim 7, wherein a first one of the plurality of signal peaks corresponds to the beginning of a Sounding Reference Signal (SRS), and a second one of the plurality of signal peaks corresponds to the end of the SRS.

9. The method according to claim 3, wherein the evaluating of the frequency information further comprises performing a Fast Fourier Transform (FFT) on each symbol contained within a time slot to recover a Resource Grid for that time slot.

10. A method for passively classifying a signal as a user equipment (UE) generated uplink communication in accordance with in an LTE communication standard, comprising:
   selectively acquiring radio frequency (RF) signals originating within a predefined geographic area;
   evaluating physical parameters of the RF signals, including frequency information and signal timing information to identify at least one potential UE generated uplink communication;
   extracting from the potential UE generated uplink communication information concerning an extracted bit sequence contained in a time slot in which a Demodulation Reference Signal (DRS) would be transmitted by the UE in an actual uplink communication in accordance with the LTE communication standard;
   comparing the information concerning the extracted bit sequence with information concerning a plurality of known bit sequences specified for DRS in an LTE uplink communication;
   selectively classifying the acquired RF signal as a UE generated uplink operating accordance with an LTE standard if the comparing satisfies a predetermined correlation condition; and
   determining the sum of the energy present in each Resource Block of the acquired RF signal, and comparing the sum to a first threshold value to determine if a potential LTE uplink signal is present in that Resource Block.

11. The method according to claim 10, further comprising finding groups of signal occupied Resource Blocks, that are contiguous in frequency, and treating each said group as an uplink packet.

12. The method according to claim 11, wherein the extracting step further comprises for each uplink packet, extracting a plurality of Resource Grid elements corresponding to the subcarriers of the DRS sequence.

13. A method for passively classifying a signal as a user equipment (UE) generated uplink communication in accordance with in an LTE communication standard, comprising:
   selectively acquiring radio frequency (RF) signals originating within a predefined geographic area;
   evaluating physical parameters of the RF signals, including frequency information and signal timing information to identify at least one potential UE generated uplink communication;
   extracting from the potential UE generated uplink communication information concerning an extracted bit sequence contained in a time slot in which a Demodulation Reference Signal (DRS) would be transmitted by the UE in an actual uplink communication in accordance with the LTE communication standard;
   comparing the information concerning the extracted bit sequence with information concerning a plurality of known bit sequences specified for DRS in an LTE uplink communication; and
   selectively classifying the acquired RF signal as a UE generated uplink operating accordance with an LTE standard if the comparing satisfies a predetermined correlation condition;
   wherein the comparing comprises comparing the extracted bit sequence with the plurality of known bit sequences specified for DRS in an uplink communication over a range of possible Cyclic Shifts between 0 and $2\pi$.

14. The method according to claim 13, further comprising choosing a sequence group number and Cyclic Shift pair that yields a highest correlation value.

15. The method according to claim 14, further comprising computing a difference between the highest correlation value and the next highest peak correlation value achieved for any other sequence group.

16. The method according to claim 13, wherein the range of possible cyclic shifts exceeds a number of Cyclic Shifts which are specified for an LTE uplink signal in accordance with an LTE standard.

17. A system for passively classifying a signal as a user equipment (UE) generated uplink communication in accordance with an LTE communication standard, comprising:
   a radio frequency receiver configured to selectively acquire radio frequency (RF) signals originating within a predefined geographic area; and
   a computer processor configured to:
      evaluate physical parameters of the RF signals, including frequency information and signal timing information, to identify at least one RF signal that has at least one physical characteristic which is known to correspond to an LTE uplink transmission;
      selectively classify the identified at least one RF signal as a potential UE generated uplink communication;
      extract from the potential UE generated uplink communication information concerning an extracted bit sequence contained in a time slot in which a Demodulation Reference Signal (DRS) would be transmitted by the UE in an actual uplink communication in accordance with the LTE communication standard, the DRS comprising a known bit sequence permitted by the LTE communication standard for channel estimation;
      compare the information concerning the extracted bit sequence with information concerning a plurality of known bit sequences specified for DRS in an LTE uplink communication; and
      selectively re-classify the identified at least one RF signal as a UE generated uplink operating in accordance with an LTE standard if the comparing satisfies a predetermined correlation condition.

18. The system according to claim 17, further comprising a phase array antenna and a beamforming system configured to concurrently synthesize a plurality of antenna beams, in a plurality of antenna boresight directions, whereby signals originating from one or more UE's located within a predefined geographic area are concurrently acquired.

19. A system for passively classifying a signal as a user equipment (UE) generated uplink communication in accordance with in an LTE communication standard, comprising:
- a radio frequency receiver configured to selectively acquire radio frequency (RF) signals originating within a predefined geographic area; and
- a computer processor configured to:
  - evaluate physical parameters of the RF signals, including frequency information and signal timing information to identify at least one potential UE generated uplink communication;
  - extract from the potential UE generated uplink communication information concerning an extracted bit sequence contained in a time slot in which a Demodulation Reference Signal (DRS) would be transmitted by the UE in an actual uplink communication in accordance with the LTE communication standard;
  - compare the information concerning the extracted bit sequence with information concerning a plurality of known bit sequences specified for DRS in an LTE uplink communication; and
  - selectively classify the acquired RF signal as a UE generated uplink operating accordance with an LTE standard if the comparing satisfies a predetermined correlation condition;
- wherein the evaluating of the signal timing information performed by the computer processor further comprises recovering a slot timing directly from the acquired RF signal to determine a beginning and an end time of each time slot in the acquired signal.

20. A system for passively classifying a signal as a user equipment (UE) generated uplink communication in accordance with in an LTE communication standard, comprising:
- a radio frequency receiver configured to selectively acquire radio frequency (RF) signals originating within a predefined geographic area; and
- a computer processor configured to:
  - evaluate physical parameters of the RF signals, including frequency information and signal timing information to identify at least one potential UE generated uplink communication;
  - extract from the potential UE generated uplink communication information concerning an extracted bit sequence contained in a time slot in which a Demodulation Reference Signal (DRS) would be transmitted by the UE in an actual uplink communication in accordance with the LTE communication standard;
  - compare the information concerning the extracted bit sequence with information concerning a plurality of known bit sequences specified for DRS in an LTE uplink communication; and
  - selectively classify the acquired RF signal as a UE generated uplink operating accordance with an LTE standard if the comparing satisfies a predetermined correlation condition;
- wherein the comparing performed by the signal processor further comprises comparing the extracted bit sequence with the plurality of known bit sequences specified for DRS in an uplink communication over a range of possible Cyclic Shifts between 0 and $2\pi$.

* * * * *